United States Patent
Francis et al.

(10) Patent No.: US 9,970,075 B2
(45) Date of Patent: May 15, 2018

(54) SULFONAMIDE-BASED SEPARATION MEDIA FOR RARE EARTH ELEMENT SEPARATIONS

(71) Applicant: THE REGENTS OF THE UNIVERSITY OF CALIFORNIA, Oakland, CA (US)

(72) Inventors: Matthew B. Francis, Berkeley, CA (US); Troy Moore, Placentia, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 261 days.

(21) Appl. No.: 14/834,074

(22) Filed: Aug. 24, 2015

(65) Prior Publication Data

US 2016/0053344 A1 Feb. 25, 2016

Related U.S. Application Data

(60) Provisional application No. 62/041,457, filed on Aug. 25, 2014.

(51) Int. Cl.
  *C22B 3/00* (2006.01)
  *C22B 3/24* (2006.01)
  *C22B 59/00* (2006.01)

(52) U.S. Cl.
  CPC .............. *C22B 3/24* (2013.01); *C22B 59/00* (2013.01); *Y02P 10/234* (2015.11)

(58) Field of Classification Search
  CPC ...... C08F 8/18; C08F 8/20; C08F 8/30; C08F 8/34; C22B 59/00; C22B 3/24
  USPC .............. 210/660, 661, 681, 688; 423/21.5; 521/30–32
  See application file for complete search history.

(56) References Cited

U.S. PATENT DOCUMENTS

| | | | | | |
|---|---|---|---|---|---|
| 2,618,655 | A | * | 11/1952 | Stanin | C07C 311/15 526/288 |
| 2,750,358 | A | * | 6/1956 | Park | C08F 8/34 525/331.5 |
| 2,867,611 | A | * | 1/1959 | Teot | C08F 8/34 525/329.2 |
| 7,323,109 | B2 | * | 1/2008 | Bringley | C08F 212/14 210/681 |
| 2001/0031233 | A1 | * | 10/2001 | Bruening | B01J 45/00 423/70 |
| 2011/0277592 | A1 | * | 11/2011 | Cutler | C22B 3/24 75/393 |
| 2016/0225472 | A1 | * | 8/2016 | Holliday | C22B 3/24 |

* cited by examiner

*Primary Examiner* — Steven J Bos
(74) *Attorney, Agent, or Firm* — O'Banion & Ritchey LLP; John P. O'Banion

(57) ABSTRACT

A sulfonamide based rare earth element ion separation media and method of synthesis and use are provided. A bed or column of sulfonamide resin for separations can be prepared by exposing a sulfonate resin to chlorosulfonic acid to form a sulfonyl chloride resin; exposing the sulfonyl chloride resin to aqueous ammonia to form a sulfonamide resin; and then packing the sulfonamide resin into a separation column. Mixtures of lanthanide and other rare earth ions with very similar atomic radii and characteristics can be separated by flowing a mixture of lanthanide ions through a bed of sulfonamide resin followed by a mobile phase of an organic acid such as lactic acid to elute the separated rare earth element ions separated by the sulfonamide resin. Collected fractions of eluate can also be recycled through the sulfonamide media.

10 Claims, 5 Drawing Sheets

SULFONAMIDE-BASED SEPARATION MEDIA FOR RARE EARTH ELEMENT SEPARATIONS

CROSS-REFERENCE TO RELATED APPLICATIONS

This application claims priority to, and the benefit of, U.S. provisional patent application Ser. No. 62/041,457 filed on Aug. 25, 2014, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

BACKGROUND

1. Technical Field

The present technology pertains generally to devices and methods for separating rare earth elements from aqueous solutions and, more particularly, to a sulfonamide based separation media for lanthanide and other rare earth element separations.

2. Background

Rising demand for commercial products that incorporate rare earth elements has increased the need for highly purified sources of these elements and the development of selective separation techniques. Some of the major uses of rare earth elements include alloys, rechargeable batteries, chemical catalysts, phosphors for flat panel displays, permanent magnets and polishing compounds. Rare earth elements are also found in a wide variety of products including medical devices, lasers, space based satellites and communications systems.

The rare earth elements are composed of the lanthanide group of elements, atomic numbers 57-71 of the periodic table, and yttrium and scandium. The lanthanides consist of lanthanum, cerium, praseodymium, neodymium, promethium, samarium, europium, gadolinium, terbium, dysprosium, holmium, erbium, thulium, ytterbium, and lutetium.

The separation of lanthanides from each other is a difficult task because of their similar chemical structure and physical properties. The ions of adjacent lanthanide elements in the periodic table have very similar ionic radii and the same valence. Consequently, they normally cannot be separated using conventional adsorption or ion exchange processes.

Rare earth elements are usually obtained from ore concentrates of earth oxides. Historically, lanthanide separations have utilized laborious and expensive procedures to separate the rare earth oxide concentrates into their individual components. Current production facilities use multiple sequential and parallel solvent extraction processes for extraction, exploiting minute differences in the solubilities of different lanthanide ion complexes. This process is not ideal, however, because it is time consuming, generates large amounts of waste, and often requires sizable quantities of expensive organic acid ligands and toxic solvents. Although improvements in these extraction procedures are likely to streamline the rare earth separation process to some extent, the rapidly growing use of these elements in magnets, batteries, displays, and medical technologies creates a demand for new technologies that can achieve the purification of lanthanide ion mixtures with higher efficiency and substantially less waste generation.

Another area of use of lanthanide separations is the separation of lanthanides from spent nuclear fuels. Processing of spent fuel rods leaves a mixture of americium, curium, lanthanides and some other isotopes. Removal of the lanthanides from the actinides americium and curium from the processed mixture is necessary to allow the use of the recovered material in advanced nuclear reactors. However, this separation is also difficult to accomplish due to the similarities in the chemical properties of the trivalent actinides and lanthanides.

The separation of lanthanides from water contaminated with lanthanides is another area where a selective separation schemes are needed that can separate lanthanides in the presence of common ions such as calcium and magnesium.

Accordingly, there is a need for devices and methods for selectively separating different rare earth elements from each other and from contaminants that are highly efficient, inexpensive to produce and simple to use with existing industrial scale on exchange column systems. The present technology satisfies this need as well as others and is generally an advancement in the art.

BRIEF SUMMARY

The present technology provides a separation media that can be used with industrial scale methods for separations of rare earth element ions. The sulfonamide separation media is an inexpensive and recyclable media that can achieve the efficient separation of lanthanide ion mixtures. The advantages of this process are primarily characterized by minimal waste production, environmentally benign components and by-products, low pressure operation, and a high potential for economical scalability.

The central approach involves the production and use of a solid phase media with sulfonamide functional groups attached to polymer supports, in conjunction with soluble small organic acids, as a good system for binding mixtures of lanthanide ions with differential affinities. In the full-scale version of this technique, the sulfonamide functional groups can be attached to inexpensive polymer beads, which are packed into large conventional columns for use in an industrial setting. Solutions containing combinations of lanthanide ions can be produced with standard bioleaching or chemical leaching processes currently employed in the refining industry, and then applied to these columns. A mobile aqueous phase containing a soluble organic acid is next passed through the beads. Weakly bound lanthanides are eluted from the beads first, followed by those that are more tightly bound. By fractionating the mobile phase as it flows from the column, samples of purified lanthanides are obtained. Once the separation is complete, the column can be reused for additional separations; ideally through thousands of cycles.

In one preferred embodiment, the separation media is formed by modification of a base material that is selected from sulfonated polystyrene resins that are commonly used for on exchange chromatography. These types of resins are available at very low cost (often below $10/kg and go by the trade names Dowex®, Amberlyst®, and Amberlite®. These base resins are already used in large filtration systems in the mining industry for the purification of waste water before it is released back into the environment. Versions of these resins are also used in very large columns to achieve separations in the gold mining industry. Thus, the fundamental engineering infrastructure has already been developed, and can be adapted for use for lanthanide separations. Additionally, the lifetimes of these resin types in continuous use scenarios are commonly several years, providing an additional economic benefit to this type of system.

In one embodiment, a bed of the sulfonamide resin is prepared and packed into a separation column. The bed is preferably prepared by exposing a sulfonate resin to chlorosulfonic acid to form a sulfonyl chloride resin. The sulfonyl chloride resin is then exposed to aqueous ammonia to form an unsubstituted sulfonamide resin that is then packed into conventional separation columns.

For separations of a mixture of lanthanide ions, for example, the sample can be applied to the bed of a stationary phase sulfonamide resin followed by a mobile phase of an organic acid such as α-hydroxyisobutyric acid (HIBA) or lactic acid, wherein the lanthanide ions are separated by the sulfonamide resin.

According to one aspect of the technology, a separation media is provided that allows high yield recovery of individual rare earth elements from a mixture of rare earth elements that is comparatively inexpensive to produce and simple to use with existing industrial scale on exchange column systems.

Another aspect of the technology is to provide an efficient process for the fractional elution of rare earth elements through the separation media at comparatively high flow rates.

A further aspect of the technology is to provide a separation media and process for the separation of rare earth elements with high purity and free from metal and other contaminants.

It is also an aspect of the technology to allow inexpensive recovery of the separation media for reuse in the current separation process or recycled for future use.

Further objects and aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawing which is for illustrative purposes only.

DETAILED DESCRIPTION

Referring more specifically to the drawings, for illustrative purposes, embodiments of the separation media and methods for rare earth element separations are generally shown. Several embodiments of the technology are described generally in FIG. 1 through FIG. 7 to illustrate the apparatus and methods. It will be appreciated that the methods may vary as to the specific steps and sequence and the apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
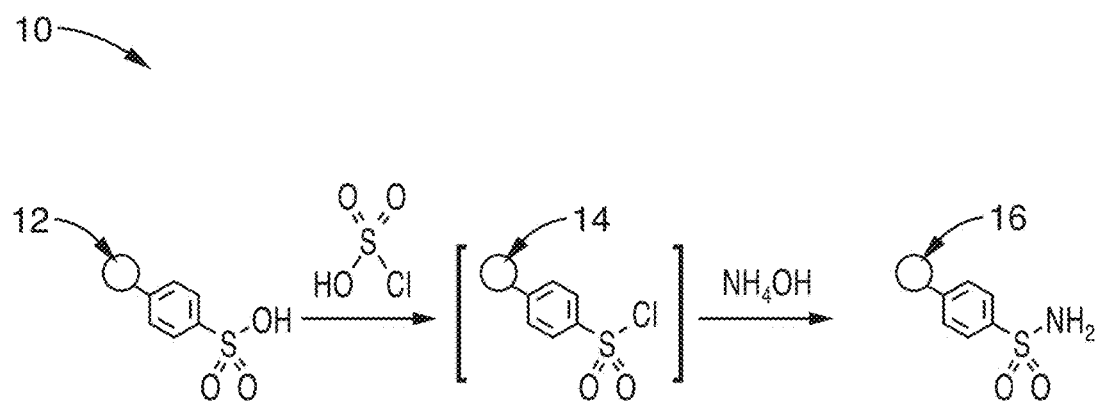
FIG. 1 is a flow diagram of a synthesis scheme for producing unsubstituted sulfonamide resins from a starting sulfonate resin according to one embodiment of the technology.

Turning now to FIG. 1, one preferred scheme 10 for producing one embodiment of a sulfonamide-based separation media for use with conventional columns to provide rare earth element separations is generally shown. The separation media that is ultimately produced begins with a sulfonate resin 12 as a starting material in scheme 10. The sulfonate resin 12 starting material is preferably a strong cation exchange resin containing sulfonic acid functional groups. The starting resin 12 can be a styrene based support in the form of a bead that is porous or with a dense internal structure with no discrete pores in one embodiment. The beads can be categorized as non-porous, microporous or macroporous.

In another embodiment, the starting support resin 12 is an acrylic based resin with sulfonic acid functional groups. In another embodiment, the initial support resin 12 is a polyester or melamine based resin.

The support bead material, size and porosity can be optimized in view of the specific type of separations that are contemplated. The nature or characteristics of anticipated contaminants, pH and temperature ranges, solvents and volumes of the separation columns that will be used may also influence the selection of the starting resin 12. However, polystyrene resins that are commonly used in ion exchange chromatography with large filtration systems are particularly preferred.

The sulfonic acid functional groups of the starting sulfonate resin 12 are then modified with chlorosulfonic acid to yield a sulfonyl chloride resin 14 intermediate the as seen in FIG. 1. The sulfonyl chloride resin 14 intermediate is then exposed to aqueous ammonia to produce the final unsubstituted sulfonamide resin 16.

The final sulfonamide resin 16 shown in FIG. 1 can be used to pack columns or form beds for separations. In one embodiment, beds of mixed resins are formed from different resins with different characteristics. For example, beds can be formed from mixtures of sulfonamide resins that were produced with different starting sulfonate resins with different starting morphology. Likewise, columns can be packed with the produced sulfonamide resins and one or more other resins that collectively can influence the flow and separation of lanthanides or known contaminants through the column.

The variety of configurations of sulfonamide separation media 16 that can be produced with this process can be adapted for use in large columns that are used in an industrial setting to process large volumes of material, for example. Processed ore mixtures or solutions of material from other rare earth sources can be applied to the packed columns. Standard bioleaching or chemical leaching processes that have been developed in the refining industry are typically used to produce solutions containing combinations of lanthanide ions. A mobile aqueous phase containing a soluble organic acid is then applied to the columns after the source material and is passed through the beads of the column. Weakly bound lanthanides are eluted from the beads first, followed by those that are more tightly bound to the media. By fractionating the mobile phase as it flows from the column, samples of purified lanthanides can be obtained. Once the separation is complete, the column can be reused for additional separations of new material or used with recycled fractions from the column.

It can be seen that the column of separation media can be homogenous or it can be tailored with mixtures of different media configurations. In addition to the column media configurations, the separation conditions can also be optimized by controlling the pH, mobile phase selection, eluent flow and concentration of the eluent. Selection of the separation media characteristics and control over the separation conditions makes it possible to separate adjacent lanthanide elements that have very similar ionic radii and properties.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the technology, an embodiment of a polystyrene based sulfonamide resin was prepared as a support for lanthanide separations. The synthetic process for the sulfonamide resin in this illustration followed the methods shown in FIG. 1. Generally, the sulfonamide resins for lanthanide separation were prepared through the exposure of the sulfonated resins to chlorosulfonic acid, followed by addition of aqueous ammonia, to yield the sulfonamide.

Specifically, Amberlite IR-120 ($Na^+$ form) was selected as the initial sulfonate resin to be used in this illustration. To a 250 mL round bottom flask equipped with a magnetic stir bar was added 50 mL of methanol, followed by 15 g of Amberlite IR-120 ($Na^+$ form). The mixture was then stirred while boiling in a 70° C. oil bath for 3 hours. Subsequently, the mixture was removed from the bath and cooled to ambient temperature. The resin was transferred to filter paper, and the methanol was filtered off by gravity. Two 20 mL portions of tetrahydrofuran (THF) were used to wash the resin. Finally, the resin was transferred to a 100 mL round bottom flask, which was then attached to a vacuum manifold. The resin was dried in vacuo for two hours.

The dried and prepared sulfonate resin was then modified to become the sulfonyl chloride resin intermediate illustrated in FIG. 1. To a 100 mL round bottom flask equipped with a magnetic stir bar was added 25 mL of chlorosulfonic acid, followed by 5 g of freshly dried Amberlite IR-120 resin, ($Na^+$ form). While stirring at ambient temperature, 4 mL of DMF was added as gas visibly evolved. A water cooled reflux condenser was attached to the flask, and the mixture was submerged in a 70° C. oil bath for 4 hours while stirring. The mixture was then removed from heat and cooled to ambient temperature. Approximately half of the chlorosulfonic acid/DMF supernatant was decanted, while the remaining resin slurry was filtered through filter paper by gravity. The resin was then rinsed with two 15 mL portions of isopropanol that had been cooled over dry ice. The resin was transferred to fresh filter paper, briefly blotted dry, and immediately used in the next reaction.

The final sulfonamide resin was then prepared from the sulfonyl chloride resin. To a 100 mL round bottom flask equipped with a magnetic stir bar was added 30 mL of aqueous ammonia. The ammonia was stirred at 0° C. for 15 min prior to the slow addition of the sulfonyl chloride resin. Gas visibly evolved during this procedure. The mixture was then stirred at 0° C. for 1 hour, at which point it was warmed to ambient temperature and stirred for an additional 2 hours. The mixture was transferred to filter paper, filtered by gravity, and washed with two 20 mL portions of $dH_2O$ and one 15 mL portion of DCM. The wet resin was dried briefly in air and transferred to a scintillation vial containing a magnetic stir bar. A quantity of 2 M HCl was added to submerge all of the resin, and the mixture stirred at ambient temperature for 5 min. The resin was then filtered again on filter paper by gravity and washed with one 10 mL portion of water. After drying in air, the sulfonamide resin was ready for use.

The resulting sulfonamide resin was then characterized using both IR spectroscopy and elemental analysis. Creation of the sulfonamide group was established by a medium-strength absorption peak centered at 1316 $cm^{-1}$, corresponding to the sulfur-oxygen double bond stretch in a sulfonamide. The total atomic composition was determined by CHNS elemental analysis, with oxygen calculated by subtraction. Notably, the molar ratio N to S gave a 96% conversion of the sulfonate groups to sulfonamides.

Example 2

To demonstrate the separation capabilities of the media, the sulfonamide resin that was prepared using the procedure of Example 1 with the structure shown in FIG. 1 was evaluated. Following preparation, the sulfonamide resins were rinsed with water and packed into cylindrical columns. For small scale experiments, 4.7 g batches of resin were housed in 5 g RediSep Rf columns. These columns were then used for separations employing a CombiFlash Companion purification system (Teledyne ISCO). Mixtures of lanthanide ions were then added to the columns, and a mobile phase was passed through the sample at a flow rate of 5-15 mL/min. At these flow rates, the back pressure of the system was 0-10 psi. The solvent eluting from the column, which contained the separated lanthanide ions, was collected in a series of sample vials. These samples were then analyzed using an Agilent 7700 Series LC-ICP-MS instrument to determine the lanthanide content of each fraction.

Figure 2:
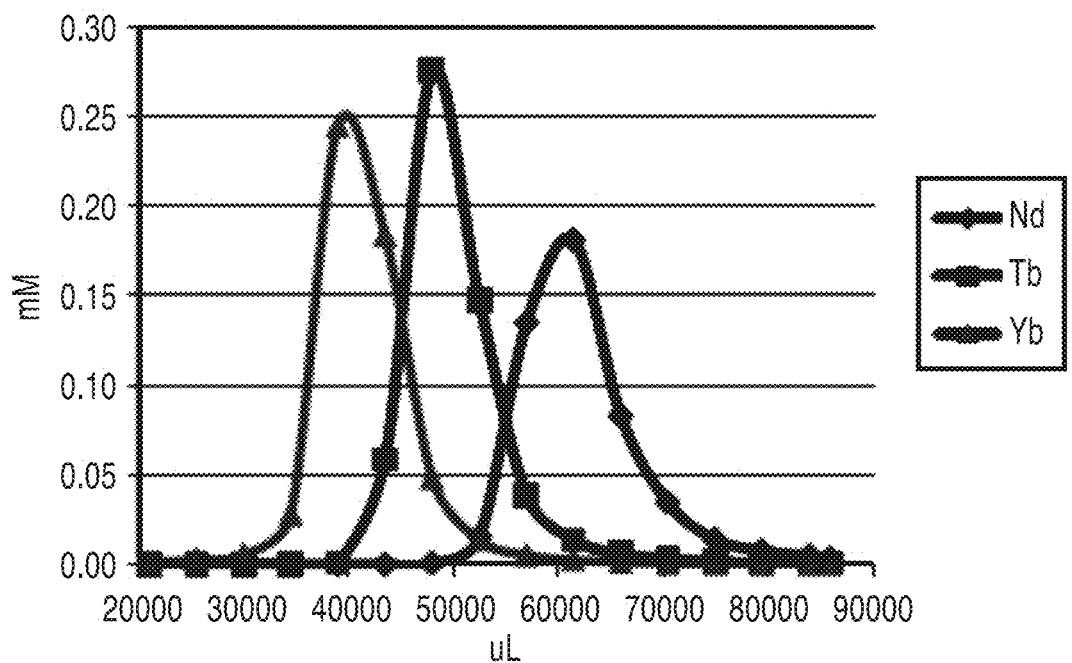
FIG. 2 is a is a graph showing separation of three lanthanide ions with reasonably good resolution using the unsubstituted sulfonamide resin depicted in FIG. 1 and a HIBA mobile phase.

As shown in FIG. 2, the unsubstituted sulfonamide resin was capable of separating an equimolar mixture of three lanthanide ions (Nd, Tb and Yb) with reasonably good resolution. The overall recovery of the lanthanides from the column was virtually 100%. This indicated good exchange kinetics, resulting from the interactions of the metal ions with the solid support. Importantly, it was found that the same column could be reused many times with the same separation results. Therefore, it is anticipated that the resin component of this process will add little to the overall cost or waste production to the lanthanide refining process, given the long lifetime of the separation media. Throughout these experiments, the trend was observed that the lighter lanthanides were more retained by the sulfonamide resins than the heavier species.

Figure 3:
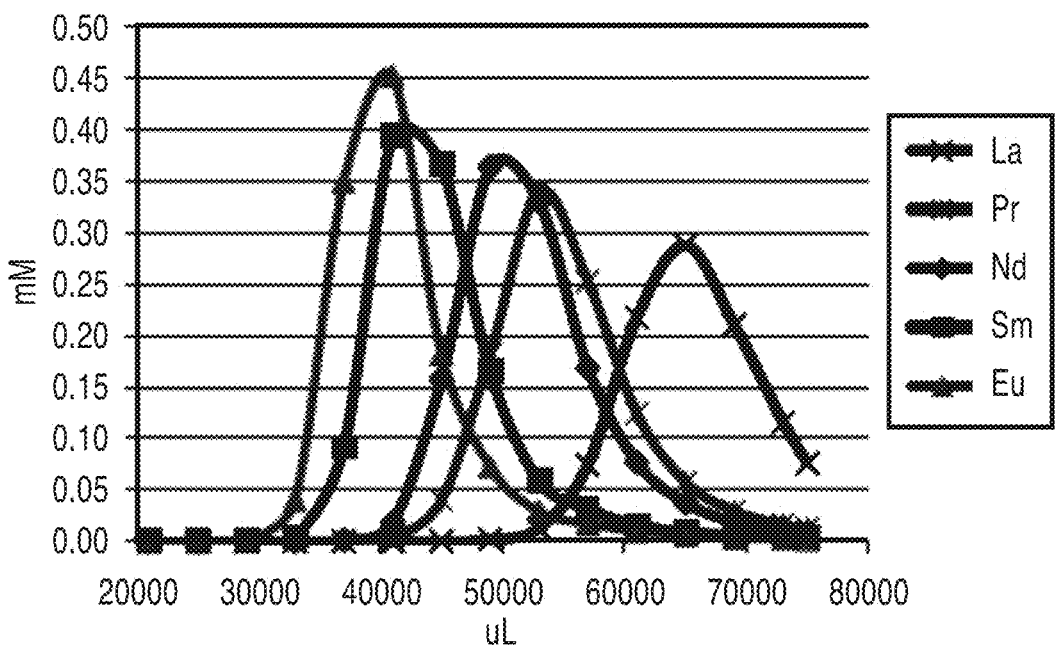
FIG. 3 is a graph showing the difficult separation of neodymium and praseodymium from three other lanthanides using the unsubstituted sulfonamide resin depicted in FIG. 1 and a HIBA mobile phase.

With these results in hand, the more difficult separation of neodymium and praseodymium from other early lanthanide contaminants was examined and the results shown in the graph of FIG. 3. Even with the small columns currently in use, partial removal of lanthanum, samarium, europium from $Pr^{3+}$, $Nd^{3+}$ was achieved. However, these results are preliminary and separations are expected to be much more successful using larger columns and more rigorously controlled chromatography equipment.

Example 3

All of the separations described above and shown in FIG. 2 and FIG. 3 were performed using α-hydroxyisobutyric acid (HIBA) as the lanthanide-binding component of the mobile phase. Although this compound is not overly expensive and could, in principle, be recycled in this process, a less expensive mobile phase additive that could be generated using biofermentation would be preferred.

Figure 4A:
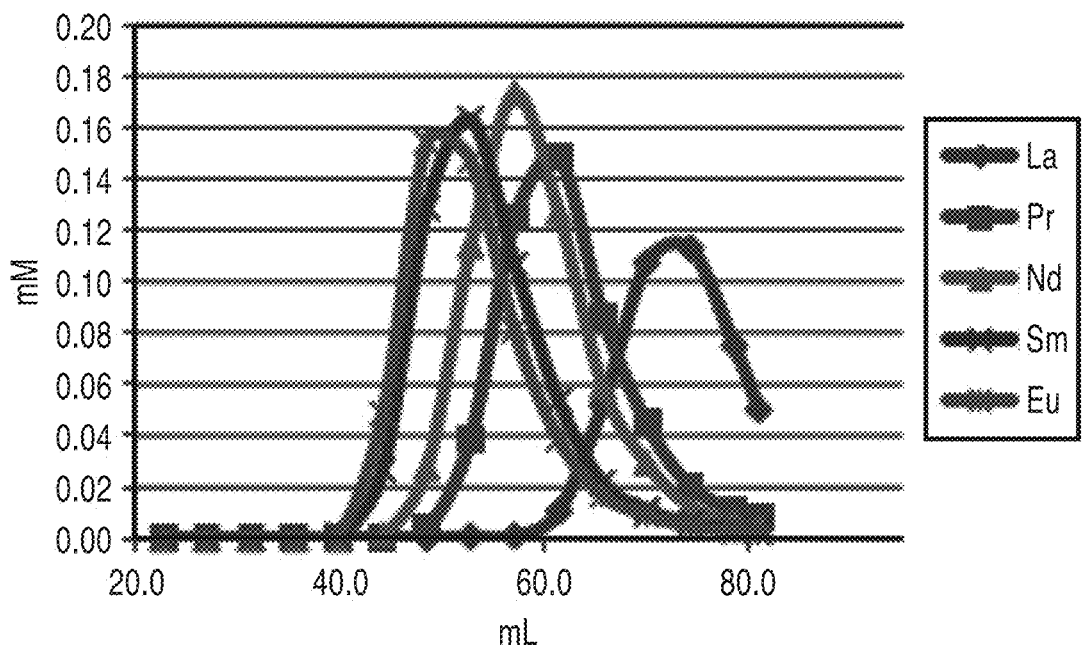
FIG. 4A is a graph showing the separation of neodymium and praseodymium from other lanthanides using the unsubstituted sulfonamide resin depicted in FIG. 1 with lactic acid as the mobile phase.
Figure 4B:
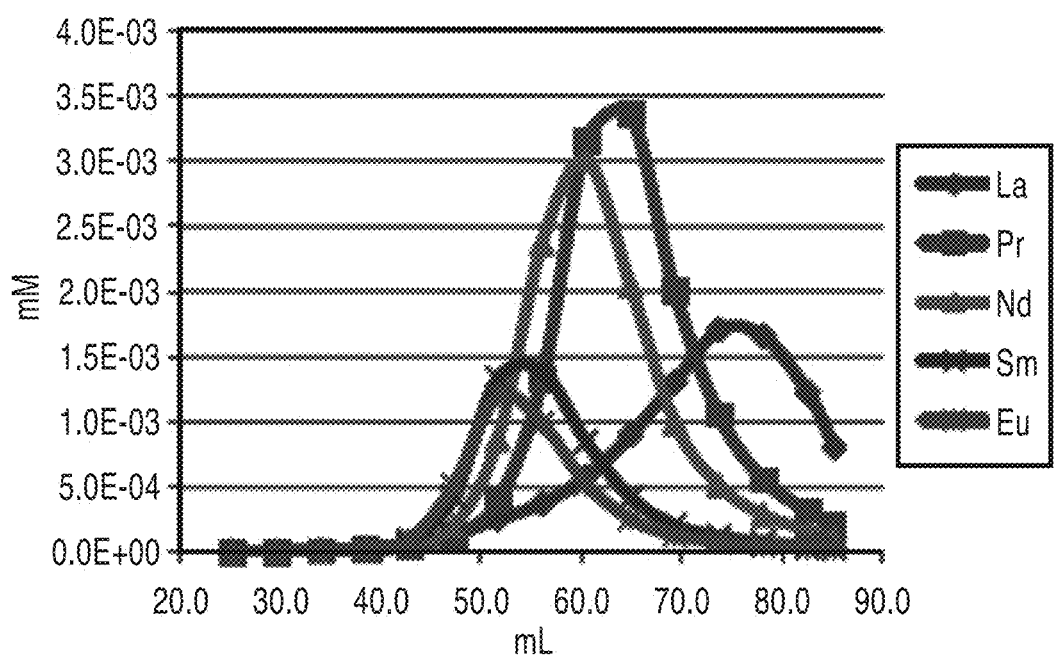
FIG. 4B is a graph showing enrichment of the separations shown in FIG. 4A by rerunning fractions through the column.

As shown in FIG. 4A and FIG. 4B, lactic acid was found to be a viable alternative to HIBA as a mobile phase. Using the small column setup, it was found that aqueous solutions of lactic acid were capable of separating the lanthanides with efficiencies approaching those achieved using HIBA as seen in FIG. 4A. Additionally, the lower chromatographic efficiency of lactic acid mobile phases can be offset by isolating fractions enriched in certain lanthanides. Subsequently, these enriched fractions, Pr/Nd enriched in this case, can be run through the same column again as shown in FIG. 4B. The result is an increasingly enriched fraction occurring with every iteration of the collected fractions through the column.

Unlike the more expensive HIBA, lactic acid can be obtained at very low cost through biofermentation, and it is actually an undesired by-product of the dairy industry. Large amounts of this compound are generated in the fermentation of yogurt, cheese, and other products, providing a continual and inexpensive supply of this component. Thus, it is perhaps the most practical mobile phase additive that could be used.

Example 4

Finally, perhaps the most relevant illustration of the system is in the exploration of real world mixtures of lanthanide ions. To achieve this, lanthanide mixtures containing $La^{+3}$, $Pr^{+3}$, $Nd^{+3}$, $Sm^{+3}$, $Eu^{+3}$, and $Tb^{+3}$ were made with proportions of each ion reflective of what is observed in the typical monazite ore sample. Cerium and promethium were notably excluded, as the former is typically removed by other means prior to separation, and the latter occurs in a negligible abundance in nature. Heavier lanthanides were also excluded, as they do not pose a greater separatory challenge than the species already included.

Figure 5A:
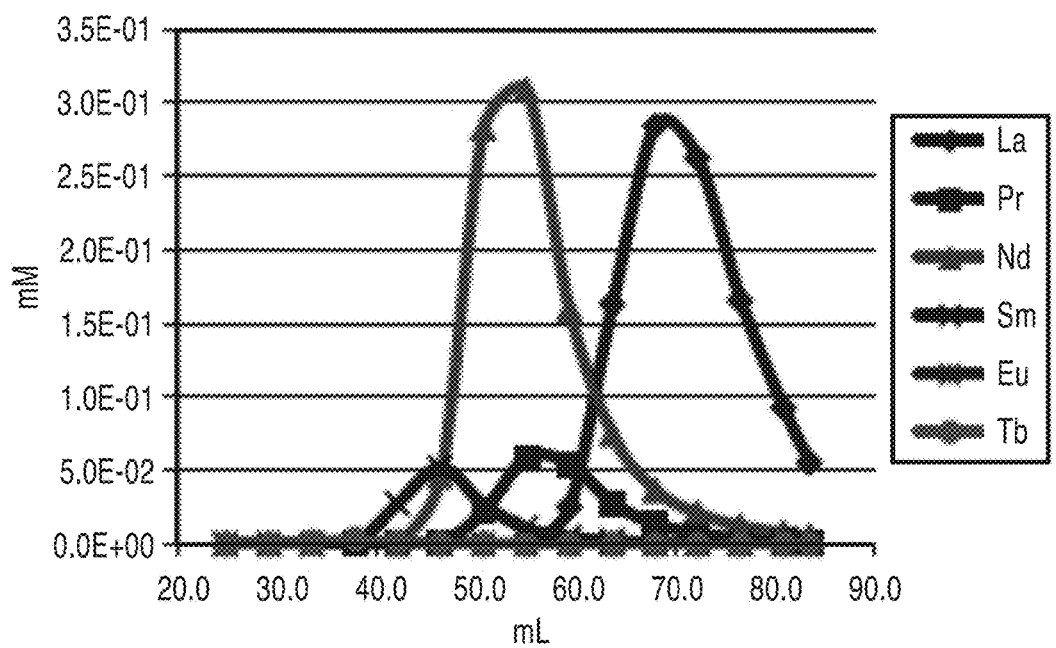
FIG. 5A is a graph showing the separation of lanthanides from a source mixture that is reflective of proportions of a typical ore source using the unsubstituted sulfonamide resin depicted in FIG. 1 with HIBA as the mobile phase.
Figure 5B:
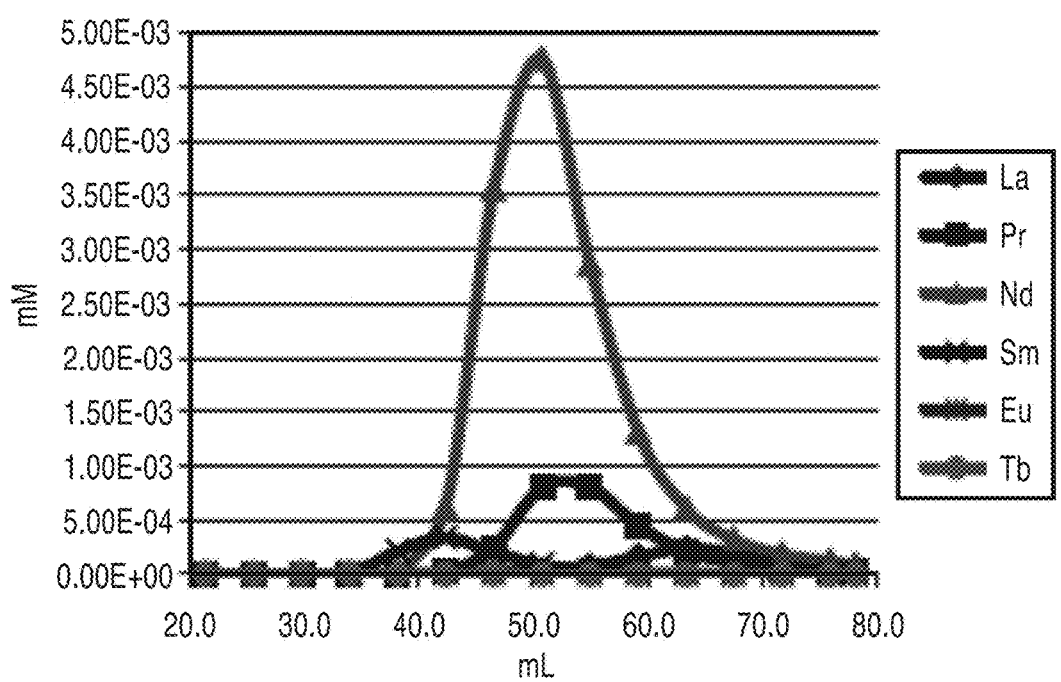
FIG. 5B is a graph showing enrichment of the separations shown in FIG. 5A by rerun.

The mixture of lanthanides was separated as described in Example 2 and the results are shown in FIG. 5A. Using HIBA as a mobile phase, excellent separation of Pr/Nd from other species was achieved. Isolating these enriched fractions and subjecting them to an identical round of chromatography on the same column yielded fractions containing mixed Pr/Nd in purities greater than 97% as shown in FIG. 5B.

Figure 6:
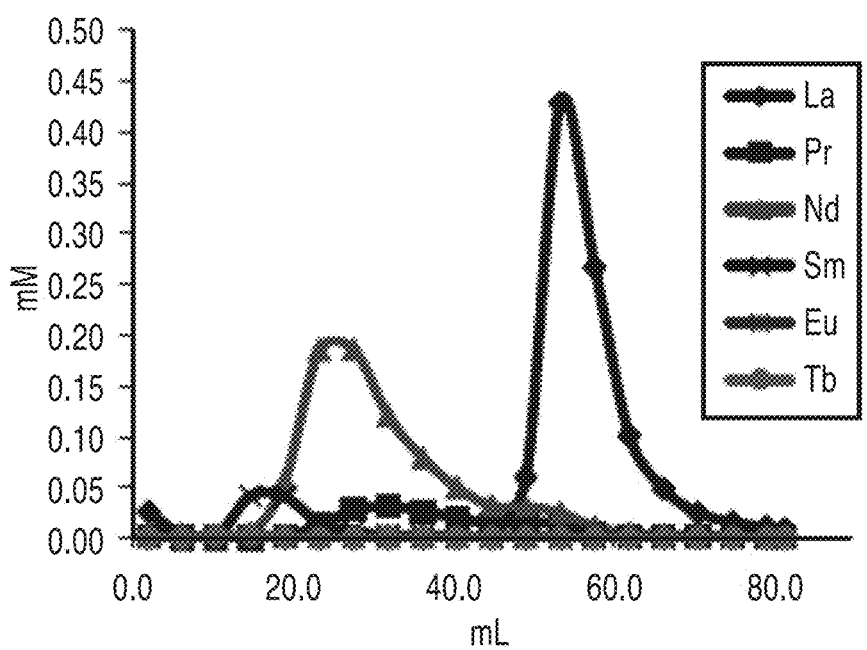
FIG. 6 is a graph showing the separation of neodymium and praseodymium from other lanthanides using the unsubstituted sulfonamide resin depicted in FIG. 1 and a HIBA mobile phase.
Figure 7:
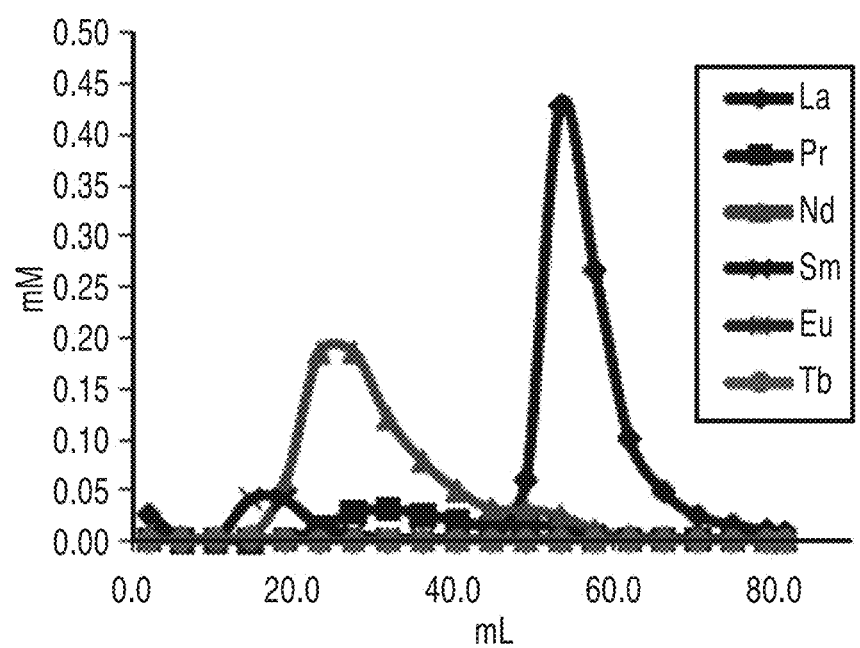
FIG. 7 is a graph showing the separation of neodymium and praseodymium from other lanthanides using the unsubstituted sulfonamide resin depicted in FIG. 1 with lactic acid as the mobile phase.

Even better separation ability was demonstrated through the use of improved gradients as shown in FIG. 6 with HIBA as the mobile phase and FIG. 7 with lactate as the mobile phase. Accordingly, the basic chromatography setup can be optimized to obtain >97% pure Nd/Pr samples in a single pass. This result is particularly significant, as this lanthanide metal combination is typically used to prepare magnets for use in a number of industrial applications. The purified lanthanum fraction is also extraordinarily useful for a number of commercial applications.

Through further improvements in the basic sulfonamide structure, we anticipate that much better separations can be achieved for both early and late lanthanide mixtures. We are currently preparing sulfonamide resins bearing alkyl substituents in order to tune the chromatographic properties further.

From the discussion above it will be appreciated that the technology described herein can be embodied in various ways, including the following:

1. A method for separating rare earth element ions, comprising: flowing a solution containing a mixture of rare earth element ions through a bed of sulfonamide resin; and collecting separated rare earth element ions from the sulfonamide resin bed.

2. The method of any preceding embodiment, further comprising: exposing a sulfonate resin to chlorosulfonic acid to form a sulfonyl chloride resin; exposing the sulfonyl chloride resin to aqueous ammonia to form an unsubstituted sulfonamide resin; and fabricating a bed of unsubstituted sulfonamide resin.

3. The method of any preceding embodiment, wherein the sulfonate resin is a resin selected from the group of resins consisting of polystyrene, acrylic, polyester and melamine.

4. The method of any preceding embodiment, further comprising: exposing a second sulfonate resin to chlorosulfonic acid to form a second sulfonyl chloride resin; exposing the second sulfonyl chloride resin to aqueous ammonia to form a second sulfonamide resin; and fabricating a mixed bed of unsubstituted sulfonamide resin and second sulfonamide resin.

5. The method as recited in claim 4, wherein the second sulfonate resin is a resin selected from the group of resins consisting of polystyrene, acrylic, polyester and melamine.

6. The method of any preceding embodiment, further comprising: flowing a mobile phase through the bed following the solution of rare earth element ions.

7. The method as recited in claim 6, wherein the mobile phase is an organic acid.

8. The method of any preceding embodiment, wherein the organic acid mobile phase comprises lactic acid or α-hydroxyisobutyric acid (HIBA).

9. The method of any preceding embodiment, further comprising: recycling collected fractions of rare earth element ion solution back through the sulfonamide resin bed to enrich the recovery.

10. A method for separating rare earth element ions, comprising: (a) fabricating a sulfonamide resin; (b) packing at least one column with the sulfonamide resin; (c) flowing a solution containing a mixture of rare earth element ions through the column of sulfonamide resin; (d) collecting separated rare earth element ions from the column of sulfonamide resin; and (e) recycling a solution of at least one fraction of collected rare earth element ions through the column of sulfonamide resin to enrich rare earth element ion fractions; and (f) accumulating enriched rare earth element ions.

11. The method of any preceding embodiment s, wherein the sulfonamide resin is fabricated following the steps comprising: exposing a sulfonate resin to chlorosulfonic acid to form a sulfonyl chloride resin; exposing the sulfonyl chloride resin to aqueous ammonia to form an unsubstituted sulfonamide resin; and fabricating a bed of unsubstituted sulfonamide resin.

12. The method of any preceding embodiment, wherein the sulfonate resin is a resin selected from the group of resins consisting of polystyrene, acrylic, polyester and melamine.

13. The method of any preceding embodiment, wherein the column is packed with a mixture of a first sulfonamide resin and a second sulfonamide resin.

14. The method of any preceding embodiment, wherein the second sulfonate resin is a resin selected from the group of resins consisting of polystyrene, acrylic, polyester and melamine.

15. The method of any preceding embodiment, further comprising: flowing a mobile phase containing at least one organic acid through the column following the solution of rare earth element ions.

16. The method of any preceding embodiment, wherein the organic acid mobile phase comprises lactic acid or α-hydroxyisobutyric acid (HIBA).

17. A method for fabricating a resin for rare earth element separations, comprising: exposing a sulfonate resin to chlorosulfonic acid to form a sulfonyl chloride resin; and exposing the sulfonyl chloride resin to aqueous ammonia to form a sulfonamide resin.

18. The method of any preceding embodiment, wherein the sulfonate resin is a resin selected from the group of resins consisting of polystyrene, acrylic, polyester and melamine.

19. The method of any preceding embodiment, wherein the sulfonate resin comprises non-porous beads.

20. The method of any preceding embodiment, wherein the sulfonamide resin comprises an unsubstituted sulfonamide resin.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method for separating rare earth element ions, the method comprising:
    flowing a solution containing a mixture of rare earth element ions through a bed of sulfonamide resin; and
    collecting separated rare earth element ions from the sulfonamide resin bed.

2. The method as recited in claim 1, further comprising:
    flowing a mobile phase through the bed following the solution of rare earth element ions.

3. The method as recited in claim 2, wherein said mobile phase is an organic acid.

4. The method as recited in claim 3, wherein said organic acid mobile phase comprises lactic acid or α-hydroxyisobutyric acid (HIBA).

5. The method as recited in claim 1, further comprising:
    recycling collected fractions of rare earth element ion solution back through the sulfonamide resin bed to enrich recovery.

6. A method for separating rare earth element ions, the method comprising:
    (a) fabricating a sulfonamide resin;
    (b) packing at least one column with said sulfonamide resin;
    (c) flowing a solution containing a mixture of rare earth element ions through said column of sulfonamide resin;
    (d) collecting separated rare earth element ions from the column of sulfonamide resin;
    (e) recycling a solution of at least one fraction of collected rare earth element ions through said column of sulfonamide resin to enrich rare earth element ion fractions; and
    (f) accumulating enriched rare earth element ions.

7. The method as recited in claim 6, wherein said column is packed with a mixture of a first sulfonamide resin and a second sulfonamide resin.

8. The method as recited in claim 7, wherein the second sulfonamide resin is formed from a resin selected from the group of resins consisting of polystyrene, acrylic, polyester and melamine.

9. The method as recited in claim 6, further comprising:
    flowing a mobile phase containing at least one organic acid through the column following the solution of rare earth element ions.

10. The method as recited in claim 9, wherein said organic acid mobile phase comprises lactic acid or α-hydroxyisobutyric acid (HIBA).

* * * * *